July 12, 1966　　C. C. BROWN　　3,260,309
LINER CEMENTING APPARATUS
Original Filed Sept. 9, 1963　　4 Sheets-Sheet 1
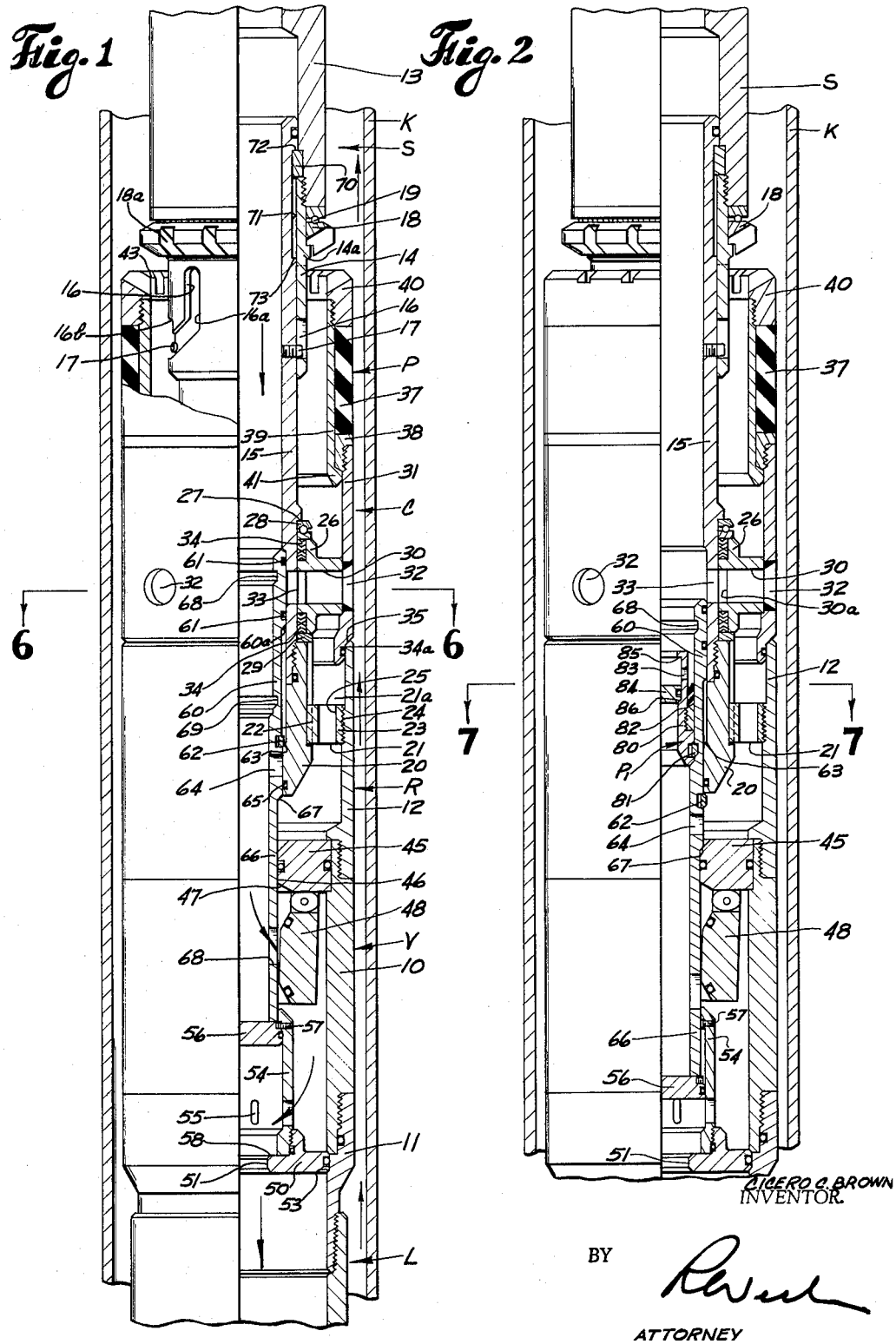
CICERO C. BROWN
INVENTOR.
BY
ATTORNEY July 12, 1966

C. C. BROWN 3,260,309

LINER CEMENTING APPARATUS

Original Filed Sept. 9, 1963

CICERO C. BROWN
INVENTOR.

BY

ATTORNEY

July 12, 1966 C. C. BROWN 3,260,309
LINER CEMENTING APPARATUS
Original Filed Sept. 9, 1963 4 Sheets-Sheet 3

CICERO C. BROWN
INVENTOR.

BY

ATTORNEY

July 12, 1966

C. C. BROWN 3,260,309

LINER CEMENTING APPARATUS

Original Filed Sept. 9, 1963

CICERO C. BROWN
INVENTOR.

BY

ATTORNEY

United States Patent Office 3,260,309
Patented July 12, 1966

3,260,309
LINER CEMENTING APPARATUS
Cicero C. Brown, c/o Brown Oil Tools, Inc.,
P.O. Box 19,236, Houston, Tex. 77024
Original application Sept. 9, 1963, Ser. No. 307,659, now
Patent No. 3,223,159, dated Dec. 14, 1965. Divided
and this application May 14, 1965, Ser. No. 455,840
7 Claims. (Cl. 166—124)

This application is a division of my copending application Serial No. 307,659, now Patent No. 3,223,159, filed September 9, 1963.

This invention is directed to an improved apparatus for cementing pipe in a well bore.

For the safe completion of a well, such as an oil or gas well, it is generally necessary to cement string of well casing, commonly called "liners" through various sections of the well bore, including the producing horizons, to effectively seal-off the annular space between the liners and the wall of the well bore. Ordinarily, the upper end of the liner will be anchored inside the lower end of a larger diameter, previously installed casing. In such operations, it is essential that the cement, when set, forms a perfect pressure-tight seal between the liner and the well-bore wall. However, it is not uncommon that the cement will not flow uniformly about the exterior of the liner, leaving voids through which pressure fluids can rise to the surface uncontrolled. Such defective cementing jobs may result from one or more of several conditions. One condition arises from the conventional method of cementing the liner wherein the cement is pumped down the inside of the liner (in a measured quantity of sufficient volume), out of the bottom of the liner, and back up around its exterior through the annular space between the liner and the well-bore wall. When the cement is being thus pumped into the important area between the liner and well-bore wall, the upward movement of the cement is opposed by gravity which tends to slow its movement and causes the cement to seek paths of least resistance. As a result, the cement will sometimes form channels which spiral upwardly around the liner, leaving voids in the body of the cement. This type of channeling usually occurs along the upper levels of the liner, the cement being usually well distributed about the liner adjacent the lower end thereof.

Another common condition resulting in defective cementing is the presence along the bore hole of a low pressure earth zone or "thief sand." When such a low pressure zone is encountered in the drilling of a well, the zone will often take the drilling mud due to the greater hydrostatic head of the drilling mud. Ordinarily, the weight of the drilling mud is made greater than the average normal pressure gradient of the earth and this difference may be further increased if higher pressure zones are encountered in order to prevent blowouts. The resulting relatively high hydrostatic head of the drilling pressure zones. In order to prevent this occurrence, starch, cellulosic and other suitable materials are added to the mud to plug the low-pressure zones and form a cake on the wall of the well bore intersecting the earth formations.

However, before a liner can be cemented in the well bore, the wall cake must be scratched off in order that the cement may adhere directly to the wall of the well bore. Since the weight of the cementing fluids must be as high as that of the drilling muds in order to prevent blowouts, the low-pressure zone now exposed will take the cement and when circulation is stopped to allow the cement to set, part of the cement will drain into the low-pressure zone, leaving a channeled and generally defective cement seal between the liner and the bore wall.

Accordingly, it is a principal object of this invention to provide an improved cementing apparatus for obviating the difficulties, such as those previously enumerated, which are encountered in sementing liner in well bores.

An important object is the provision of an improved liner cementing apparatus by which cementing is effected by what may be termed "down-flow" cementing, in which the cementing fluids flow downwardly about the exterior of the liner instead of upwardly as in the more conventional system.

A further object is to provide suitable apparatus for a down-flow cementing method which includes the steps of sealing-off the annular space between the liner and the well bore adjacent the upper end of the liner and to seal off the bore of the liner after placing of the cement, to thereby relieve the body of cement from the hydrostatic head of the fluids above the cement both inside and outside the liner.

An additional object is to provide an apparatus for effecting down-flow cementing and sealing-off of the annular space between the liner and the well bore and of the bore of the liner above the cement.

A further object is the provision of an apparatus including a retrievable liner setting and cementing tool having a cross-over head incorporated therein by means of which cementing fluids are directed to the annular space between the liner and the well-bore wall at a point adjacent the upper end of the liner and the return flow of cementing fluids through the liner is by-passed around the down-flowing stream to the annular space above the liner.

Still another object is the provision of a liner cementing apparatus which includes valve elements for closing-off the bore of the liner against pressure in both directions.

Yet another object of this invention is to provide a liner setting and cementing tool of the character described, including a packer element for sealing-off the annular space between the liner and a surrounding well casing at a point adjacent the upper end of the liner.

Another object of this invention is to provide an apparatus of the general character described in which the running-in tool, annulus seal, and cross-over head may be retrieved for re-use.

Other and more specific objects and advantages of this invention may become more readily apparent from the following detailed description when read in conjunction with the accompanying drawing which illustrates one useful embodiment in accordance with this invention.

In the drawing:

FIG. 1 is a longitudinal quarter-sectional view of the liner setting and cementing apparatus, the parts being shown in the positions occupied when the apparatus is being run into a well;

FIGS. 2, 3 and 4 are views similar to FIG. 1 showing the parts of the apparatus at successive stages in the operation thereof;

Figure 8:
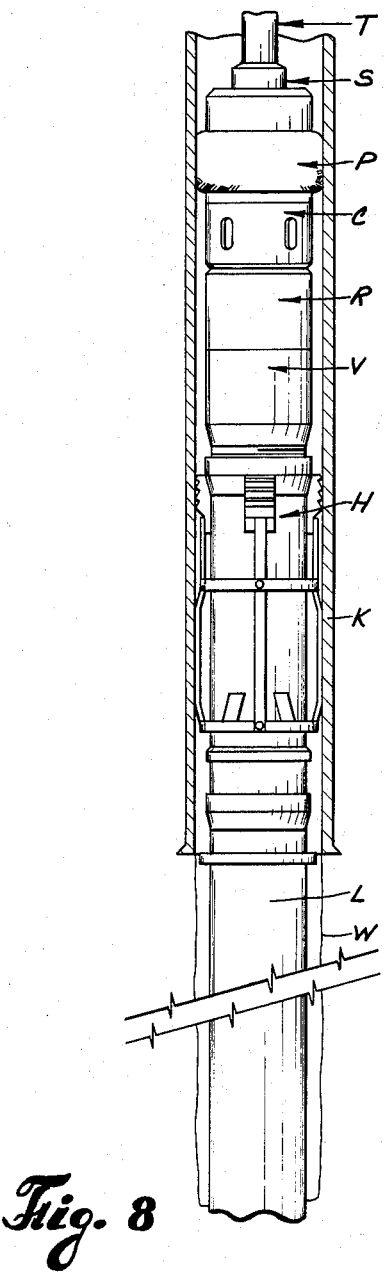
FIG. 8 is a more or less diagrammatic view showing the apparatus installed in a well bore.

Referring to the drawing and initially to FIG. 8, the apparatus in accordance with this invention is shown installed in a well bore W, an upper portion of which is lined with a pre-existing casing K. A liner L comprising a casing somewhat smaller in diameter than casing K is inserted in the well bore for purposes of lining the lower portion thereof. A liner hanger H of a generally conventional form is carried by the upper end of the liner for securing the latter to the wall of casing K. As noted, hanger H may be of any suitable and conventional form and is preferably of the type such as described in applicant's U. S. Patent No. 2,884,069, which is actuatable by vertical reciprocation of an operating pipe string to effect anchoring of the liner to the casing. A liner setting and cementing tool, in accordance with this invention, is carried into the well by a pipe string T and is releasably secured to the upper of hanger H. The liner setting and cementing tool comprises an assembly of elements by which the liner is releasably secured to the tool and to operating pipe string T. The assembly includes a liner setting unit S which extends into the interior of the assembly and is releasably secured to a connector section R which is, in turn, connected, by means of a valve section V, to the liner L, as will be described hereinafter.

A cross-over head C and a superposed packer element P are mounted on the assembly between the setting unit S and the connector section R.

Referring now to FIGS. 1 to 7, valve section V, which is mounted on the upper end of liner L, comprises a tubular valve housing 10 connected by means of an adapter 11 into the upper end of the liner above the liner hanger. Connector section R includes a tubular connector sleeve 12 which forms an upward extension of valve housing 10 and, with the latter, constitutes an extension of the liner L. Setting unit S includes a setting sleeve 13 which is connected by means of a J-sleeve 14, to a tubular mandrel 15 which extends into the interior of connector sleeve 12. J-sleeve 14 contains a bayonet or J-slot 16, including the long and short legs 16a and 16b, respectively, which cooperates with J-pins 17 projecting radially from mandrel 15. By means of the bayonet connection thus provided between the mandrel and the setting sleeve, it will be seen that by a limited amount of relative rotation between the setting sleeve and mandrel 15 a limited degree of relative longitudinal movement may be effected between these elements. J-sleeve 14 is provided with an external shoulder 14a a short distance below setting sleeve 13, and a bearing collar 18 is mounted on shoulder 17 to project radially therefrom and is provided with a plurality of radial fluid by-pass slots 18a. Antifriction bearings 19, such as conventional roller bearings, are mounted between bearing ring 18 and the lower end of setting sleeve 13 to permit relative rotation between the setting sleeve 13 and its connected J-sleeve 14 and bearing ring 18, for purposes to be described hereinafter.

The lower end of mandrel 15 carries a coaxial guide collar 20 which extends into the bore of connector sleeve 12. An annular traveling nut 21 is mounted in the annular space 21a between the exterior of guide collar 20 and the interior of connector sleeve 12 to provide a releasable connection between mandrel 15 and sleeve 12 and through the latter with the liner. The bore of nut 21 and the exterior of guide collar 20 are provided with cooperating splines 22 which prevent relative rotation between the nut and the guide collar, while permitting relative longitudinal movement therebetween. The exterior of nut 21 is provided with threads 23 which cooperate with a section of threads 24 located in an intermediate portion of connector sleeve 12, the upper end portion of which is somewhat larger in internal diameter than thread section 24. It will be seen that with this type connection, rotation of the mandrel, while the liner and its interconnected connector sleeve 12 remain stationary, will cause nut 21 to travel upwardly and be released from threads 24 after a suitable amount of such relative rotation and thereby release mandrel 15 from its connection to liner L. Nut 21 is provided with a plurality of vertical openings 25 through the body thereof for purposes to be described hereinafter.

Crossover section C includes an annular cross-over head 26 rotatably mounted about the exterior of mandrel 15 and held in longitudinally fixed position thereon between the upper end of guide collar 20 and an external shoulder 27 formed on the exterior of mandrel 15. Upper and lower antifriction bearings 28 and 29, respectively, are positioned between the ends of the cross-over head and the abutments or shoulders between which it is mounted to enable free rotation of mandrel 15 relative to the crossover head. The latter is provided with a plurality of radially extending nozzles 30, the outer ends of which are welded to a port sleeve 31 which is substantially in alignment with connector sleeve 12. Port sleeve 31 has a plurality of ports 32 communicating with the outer ends of nozzles 30 and the inner ends of the latter communicate with radial ports 33 provided in the wall of mandrel 15. Suitable seal packings 34 are disposed about the nozzles to provide fluid-tight seals between the nozzles and the exterior of mandrel 15 above and below ports 33. An annular groove 30a is provided in the inner wall of head 26 connecting the inner ends of nozzles 30 and providing communication to ports 33 at all angular positions of the latter. The lower end of port sleeve 31 is provided with an inwardly offset lip 34a which is slidably receivable in the bore of connector sleeve 12 above nut 21. The offset configuration of lip 34a defines a downwardly facing annular shoulder 35 which is adapted to engage and seat on the upper end of connector sleeve 12.

Packer section P includes an annular resilient seal packing 37 secured by means of a lower end ring 38 to the upper end of port sleeve 31. A tubular packer mandrel 39 extends through the bore of seal packing 37 and is secured to an upper end ring 40 which bears against the upper end of seal packing 37. The lower end of packer mandrel 39 carries an outwardly turned lip 41 engageable beneath the lower end of lower end ring 38 to limit upward movement of the packer mandrel relative to the seal packing. With this construction, it will be seen that when weight is applied to upper end ring 40, seal packing 37 will be axially compressed against the stationary abutment defined by lower end ring 38 and port sleeve 31, and thereby expanded, and will function to seal off the annulus between connector sleeve 31 and its several subadjacent elements and the surrounding wall of casing K. Upper end ring 40 may be provided with a plurality of milled radial slots 43 to permit free passage of fluid from the interior of the packer section to the exterior thereof.

Valve section V, which includes the valve housing 10, has mounted in its upper end a valve ring 45 having an axial bore 46 therethrough terminating at its lower end in an annular valve seat 47. A flapper valve 48 is hingedly secured to the lower end of ring 45 and is arranged to swing, relative to seat 47, between positions opening and closing bore 46 to the passage of fluids. Flapper valve 48 will, therefore, act as a check valve when in the closed position to prevent upward flow of fluid through bore 46, while permitting downward flow of fluid therethrough. Spaced below valve ring 45 and flapper valve 48 inside valve housing 10, is a bottom cage ring 50 having an axial passage 51 therethrough. Cage ring 50 is seated on an internal shoulder 53 provided in the bore of adapter 11 and held in place by the lower end of housing 10. A tubular valve cage 54 is mounted on ring 50 surrounding bore 51 and is provided near its lower end with a plurality of radial ports 55 providing communication through bore 51 between the interior of the liner and the interior of valve housing 10 above cage ring 50. A disk-shaped check valve 56 is slidably mounted in the bore of cage 54, being initially secured to the upper end thereof by means of suitable releasable fastenings such as conventional shear pins 57, and is adapted, when released, to slide downwardly in the bore of cage 54 and seat on a lower shoulder 58 in the valve cage whereby to close off bore 51 below ports 55. Thus, check valve 56, when seated on seat 58, serves to prevent downward flow of fluid from the interior of valve housing 10 to the interior of liner L, while permitting upward flow therebetween.

Positioned inside the bore of mandrel 15 is a sleeve valve 60 which is arranged to control fluid flow through ports 33 and thence through nozzles 30 of the cross-over head. The upper end of sleeve valve 60 is provided with longitudinally spaced packings 61—61 adapted to seal between the exterior of the sleeve valve and the interior of mandrel 15 above and below ports 33 (FIG. 1). At a point below lower seal packing 61, the sleeve valve carries a compressible snap ring 62 which projects exteriorly of the sleeve valve and is engageable with an upwardly facing tapered shoulder 63 provided in the bore wall of guide collar 20 at a point a short distance above the lower end of the latter. Thus, the engagement between snap ring 62 and shoulder 63 limits downward movement of the sleeve valve relative to the mandrel. However, the engaging surfaces of snap ring 62 and shoulder 63 are rounded so that when sufficient downward pressure is applied to sleeve valve 60, snap ring 62 will be compressed by reaction with shoulder 63 and will be forced past the latter. Immediately below snap ring 62, sleeve valve 60 is provided with a plurality of radial ports 64 and a seal packing 65 is mounted in the bore of guide ring 20, near its lower end, so as to seal about the exterior of the sleeve valve just below ports 64 when the sleeve valve is in the position illustrated in FIG. 1, seal packing 65, when in this position, cooperating with lower seal packing 61 to seal off between the sleeve valve and mandrel 15 on both sides of ports 64. The external diameter of sleeve valve 60 is reduced somewhat beginning at a point just below ports 64 to form an extension 66 and provide the downwardly facing shoulder 67, the purpose of which will appear subsequently. Extension 66 is of such a length as to extend through bore 46 of upper valve ring 45 and hold flapper valve 48 in its open position, the lower end of extension 66 extending into the upper end of lower valve cage 54 in abutting relation to valve 56 when the latter is in its uppermost position seen in FIG. 1. Extension 66 is provided with a plurality of radial ports 68 at a point below upper valve ring 45.

The bore of sleeve valve 60 is provided with longitudinally spaced upper and lower latching grooves 68 and 69, respectively, lower latching groove 69 being located above ports 64, and upper groove 68 near the upper end of the sleeve valve, for purposes which appear hereinafter.

A split ring 70 is mounted in the bore of setting sleeve 13 to project into an annular recess 71 provided in the exterior of the upper portion of mandrel 15 and defining the downwardly facing shoulder 72 at its upper end and the upwardly facing shoulder 73 at its lower end. Relative longitudinal movement between setting sleeve 13 and mandrel 15 will be limited by engagement of split ring 70 with one or the other of shoulders 72 and 73. In the initial running-in position shoulder 72 will be seated on ring 70 as seen in FIG. 1.

Operation of the device is as follows: The tool string carrying the liner L and hanger H and attached to operating pipe string T will be run into well bore W through casing K until the hanger is near the lower end of the latter. The several parts of the tool string will be as illustrated in FIG. 1. When the desired location in casing K has been attained, suitable longitudinal reciprocations of the operating pipe string will actuate the liner hanger in the known manner to effectively secure the liner to the wall of casing K. Throughout these initial operations no relative movement between the several parts of the liner setting and cementing tool will occur, since all of the parts are effectively secured to each other by means of the connector nut 21. During the running-in operation, sleeve valve 60 will be in its uppermost position blocking off ports 33 and 64. Fluid will thus be caused to circulate through the interior of the tool string and out the bottom of the liner, thence upwardly between the liner and the well bore wall in order to prevent sticking of the tool string in the well bore. The general direction of the circulating fluid is indicated by the arrows in FIG. 1. It will be seen that the fluid flows downwardly through the bore of mandrel 15 and by reason of the blocking of ports 33 and 64 provided by sleeve valve 60 and by check valve 56, will be diverted through ports 68 into the interior of housing 10 and thence through ports 55 and bore 51 into the bore of liner L, from the lower end of which the fluid will flow upwardly through the annular space between the liner and tool string and the surrounding bore wall and casing K, as indicated.

With the liner in position, the cementing operation is begun. As the initial step, a first plug $P_1$ (FIG. 2) of conventional design, will be pumped down the bore of the operating string and through sleeve valve 60 until it latches into lower latching groove 69. Plug $P_1$, as indicated, is of well known design, comprising a tubular body 80 having a latch ring 81 mounted in its exterior for engaging one of the latching grooves 68 or 69, and carrying a flexible sealing lip 82 about its exterior above the latch ring for sealing between the plug and the bore wall of sleeve valve 60. The plug has ports 83 through the wall thereof and a disk-shaped check valve 84 slidably disposed in the bore of the plug body for movement between upper and lower stops 85 and 86, respectively, on opposite sides of ports 83. In its lowermost position, check valve 84 serves to close off downflow of fluid through the bore of the plug, while in its uppermost position, upward flow through the bore of the plug and out ports 83 may occur. The pressure of the fluid employed to pump down plug $P_1$ will act to move check valve 84 to its lowermost position closing off the bore of the sleeve valve. Thereupon, continued application of fluid pressure from the surface acting on plug $P_1$ will drive sleeve valve 60 downwardly, forcing snap ring 62 past shoulder 63 and shifting the sleeve valve downwardly until stopped by engagement of external shoulder 67 with upper valve ring 45. This movement of the sleeve valve will open ports 33 and 64 and will cause the end of extension 66 to apply downward force to check valve 56 sufficient to break shear pins 57 and free check valve 56 for movement downwardly in valve cage 54 toward seat 58. The positions of the several parts just described are best seen in FIG. 2. Opening of ports 33 and 64 and closing off of the bore of sleeve valve 60 between these ports will now place the interior of the operating string in communication with the annular space between the setting and cementing tool and the attached liner and the surrounding well wall at a point adjacent the upper end of liner L.

Figure 3:
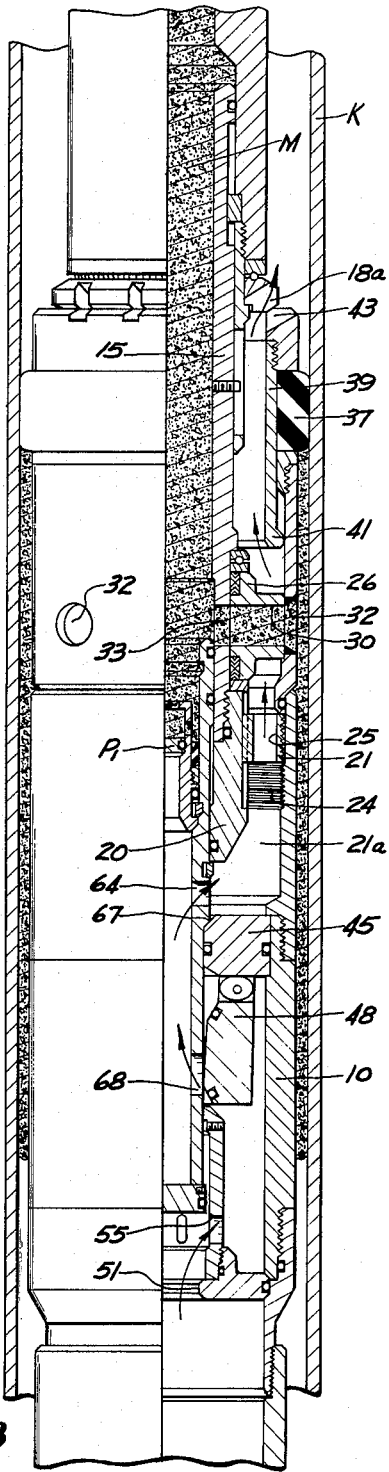

The operating string will next be rotated to the right and lowered slightly actuating the J-connection to place J-pins 17 in alignment with slots 16a. This will permit sufficient downward movement of setting sleeve S and J-sleeve 14 to bring bearing ring 18 into engagement with upper end ring 40 and to apply downward force to seal packing 37 and expand the latter into sealing engagement with the wall of casing K, thereby sealing off the annular space between the latter and the cementing string and the liner above the upper end of the liner. This position of the parts is shown in FIG. 3. The relative rotational and downward movement of the operating string is made possible by the fact that the liner is secured to casing K and the portions of the tool string mounted on the liner will, of course, be held stationary to permit the relative movements of the operating string. The operating string will now be rotated to the right which will act through the engagement of J-pins 17 with the walls of longer leg 16a of the J-slot to rotate mandrel 15 and guide collar 20. This rotation will act through splined connection 22 to rotate traveling nut 21 and cause it to move upwardly relative to threads 24 until the nut is released from its connection to connector sleeve 12 (FIG. 3).

The cement M which will be used to cement the liner in place will be pumped through the interior of the operating pipe string behind plug $P_1$. As in conventional practice, a correctly predetermined volume of cement is thus introduced which will exactly fill the annular space between the liner and the well bore wall throughout the entire length of the liner. The cement will be discharged through ports 33, nozzles 30 and ports 32 to the exterior of the liner. Since seal packing 37 has been set to seal off above the point of entry of the cement, there can be no communication with the well bore above the body of cement so that the cement will flow downwardly around the exterior of the liner. Aided by gravity, this cement will flow smoothly about the exterior of the liner and will form a good solid cement seal between the liner and well bore wall. The body of well fluids or mud which are conventionally pumped ahead of the body of cement will be forced through the lower end of the liner, back up the interior thereof and will be discharged through check valve 56, thence through ports 55 and ports 68 into the bore of sleeve valve 60 and thence out again through ports 64 into annular space 21a. This well fluid will flow upwardly through openings 25 in traveling nut 21 and will flow around nozzles 30, by-passing the downwardly flowing cementing fluids passing therethrough to the exterior of the liner. The return flow will continue upwardly through the bore of packer mandrel 39 and thence through by-pass slots 43 and 18a into the annular space between the operating string and casing K above seal packing 37 and will continue thence to the surface. The direction of flow thus described is indicated by the arrows in FIG. 3.

The body of cement being introduced will be followed by a second pump-down plug $P_2$ which is of substantially identical construction to plug $P_1$. When the entire quantity of cement necessary to fill the annulus between the liner and the wall of the well bore has been introduced, plug $P_2$ will land in the upper end of the bore of sleeve valve 60 and its snap ring 81 will latch into upper latching groove 68 and its sealing lip 82 will be positioned to seal-off between the body of plug $P_2$ and the wall of mandrel 15 above ports 33. This will prevent further crossover circulation or any flow through the sleeve valve into the liner. When second plug $P_2$ is in place, reverse circulation may be undertaken so as to clean out excess cement from the interior of the operating string and the cross-over assembly in order that the cementing tool may be removed from the well at the proper time. In accomplishing this reverse circulation, wash fluid may be circulated from the surface down through the annular space between the pipe string and casing K and thence through by-pass slots 18a and 43 into the bore of packer mandrel 39, thence through the cross-over head around nozzles 30 into annular space 21a and thence through ports 64 into the bore of sleeve valve 60 below lower plug $P_1$. The downward pressure of the fluid will hold lower check valve 56 on its seat 57, thereby closing off the bore of the liner against downward flow and will force the reverse circulation fluid to flow upwardly through the bore of sleeve valve 60 and thence through ports 83 in plug $P_1$ into the bore of plug $P_2$ and thence through its ports 83 into the bore of mandrel 15 whence it will flow upwardly through the operating pipe string to the surface. The arrows in FIG. 4 indicate the course of this reverse circulation of washing fluid.

Figure 4:
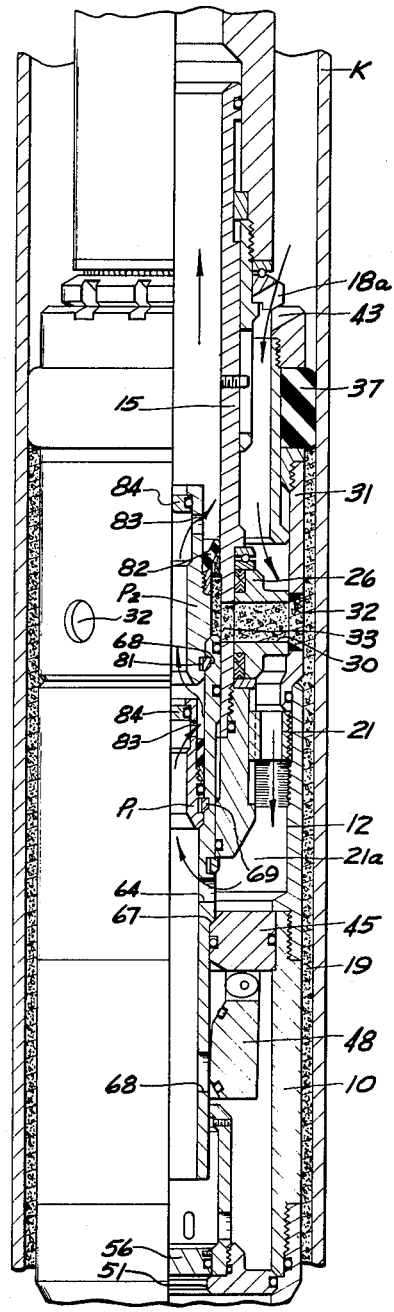

With the tool string in the position shown in FIG. 4, seal packing 37 will prevent any hydrostatic pressure acting on the cement column in the annulus between the liner and the well bore wall. Check valve 56, which will be in its lowermost position, will prevent the hydrostatic head from acting on the fluid column in the bore of the liner, so that no excess hydrostatic pressures can act on the cement to force it into any low pressure zone through which it may extend and which otherwise cause a defective job.

Before the cement has set, pipe string T will be picked straight up and this will lift bearing ring 18 off of upper end ring 43 and will serve to release seal packing 37. At the same time, the J-connection will be automatically actuated through the engagement of the J-pins with the walls of the J-slot to force the J-pins into short leg 16b of the J-slot. With the upward movement of the operating string, split ring 70 will be moved against upper shoulder 72 of the recess in mandrel 15 and continued upward pull on the operating string will then exert upward pull on mandrel 15. Since traveling nut 21 has been disconnected from connector sleeve 12, this continued upward pull on the operating string will act to withdraw the setting tool and crossover assembly from the interior of connector sleeve 12.

When mandrel 15 is thus elevated, sleeve valve 60 will remain with its shoulder 67 resting on the upper end of valve ring 45 due to the weight of the fluid column in the interior of the operating string acting on the plugs. As the mandrel is pulled upwardly, internal shoulder 63 will engage beneath shoulder 60a. This movement will have caused ports 33 to move above sealing lip 82 of upper plug $P_2$, thereby opening the ports and allowing the fluid column in the operating pipe to dump through ports 33, nozzles 30 and ports 32 into the well annulus.

Figure 5:
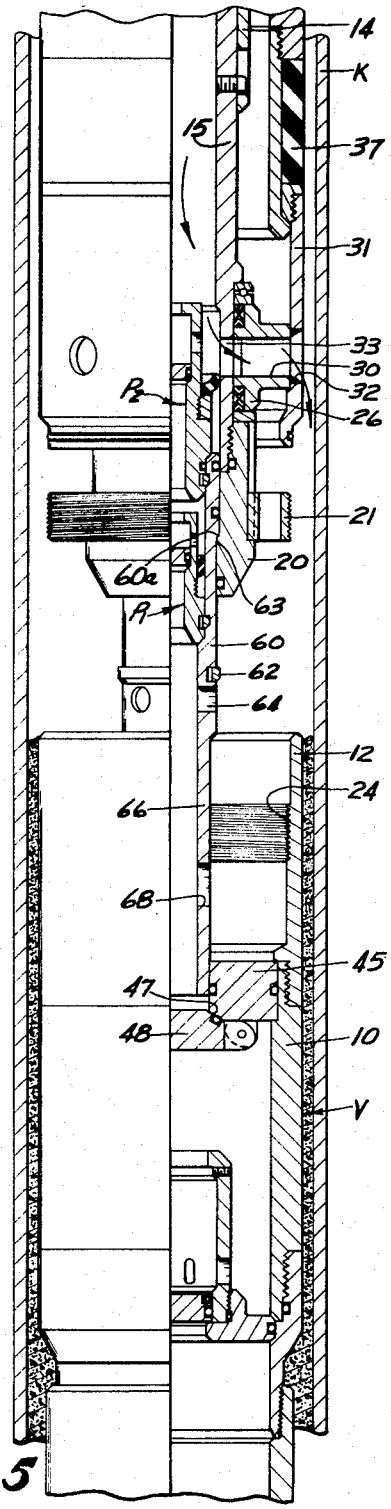
FIG. 5 is a view generally similar to FIG. 1 showing the setting and cementing tool in process of being withdrawn from the liner.
Figure 6:
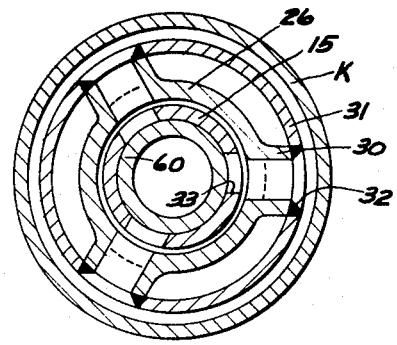
FIG. 6 is a cross-sectional view taken along line 6—6 of FIG. 1.
Figure 7:
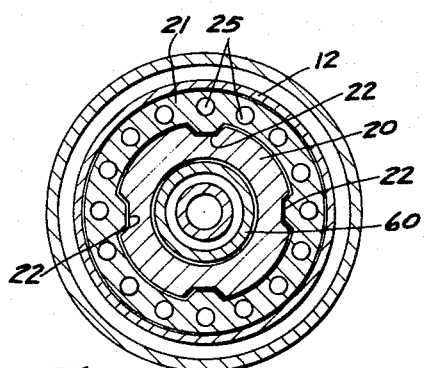
FIG. 7 is a cross-sectional view taken along line 7—7 of FIG. 2.

At the same time, as the lower end of sleeve valve extension 66 is withdrawn from the bore of valve ring 45, flapper vlave 48 will swing to its closed position on seat 47 closing off the bore of the liner to prevent any upward flow through the liner from a high pressure zone below. At the same time, check valve 56 will be on its lower seat 57 closing off the bore of the liner against fluid flow downwardly from above the liner. With the upper and lower check valves in check valve section V thus closed, the operating string, together with the crossover head and packer assembly, may be withdrawn from the well. The parts of the structure at withdrawal are illustrated in FIG. 5. Check valves 48 and 56 and the rings 45 and 50 and cage 54 cooperating therewith will normally be made of readily drillable material so that when well completion procedures are to be resumed, these valves may be easily drilled out so as to clear the bore of the liner for further operations.

It will be understood that various modifications and alterations may be made in the details of the illustrative embodiment within the scope of the appended claims but without departing from the spirit of this invention.

What I claim and desire to secure by Letters Patent is:

1. A liner setting and cementing tool for wells, comprising, a tubular extension connectible to a liner, means carried by said extension for anchoring the liner to a surrounding well casing, a tubular mandrel having radial ports through the wall thereof connectible to an operating pipe string and insertable in said extension, connector means releasably securing said mandrel to said extension and operable in response to rotation of the mandrel relative to said extension to release the mandrel, annular packer means carried on said extension about said mandrel, said packer means being expansible by axial compression transmitted from said operating string to seal off the annular space between the liner extension and said casing, cross-over means rotatably positioned about the mandrel having radial passages communicating the interior of the mandrel through said radial ports to the exterior of said extension below said packer means and having by-pass passages extending around said radial passages communicating the exterior of the extension above said packer means with the annular space between the mandrel and said extension, sleeve valve means slidably disposed in the bore of said mandrel for longitudinal movement therein between a first position closing off said radial ports and a second position opening said radial ports, plug means receivable in the bore of said sleeve valve means, said sleeve valve means when its bore has been plugged being shiftable from said first to said second position in response to fluid pressure applied thereto through said operating pipe string, port means positioned in said sleeve valve means to communicate the interior of the sleeve valve means with said by-pass passages upon shifting of said sleeve valve means from said first position to said second position, and means initially releasably securing said sleeve valve means to said mandrel in said first position.

2. A liner setting and cementing tool for wells, comprising, a tubular extension connectible to a liner, means carried by said extension for anchoring the liner to a surrounding well casing, a tubular mandrel having radial ports through the wall thereof connectible to an operating pipe string and insertable in said extension, connector means releasably securing said mandrel to said extension and operable in response to rotation of the mandrel relative to said extension to release the mandrel, annular packer means carried on said extension about said mandrel, said packer means being expansible by axial compression transmitted from said operating string to seal off the annular space between the liner extension and said casing, cross-over means rotatably positioned about the mandrel having radial passages communicating the interior of the mandrel through said radial ports to the exterior of said extension below said packer means and having by-pass passages extending around said radial passages communicating the exterior of the extension above said packer means with the annular space between the mandrel and said extension, sleeve valve means slidably disposed in the bore of said mandrel for longitudinal movement therein between a first position closing off said radial ports and a second position opening said radial ports, plug means receivable in the bore of said sleeve valve means, said sleeve valve means when its bore has been plugged being shiftable from said first to said second position in response to fluid pressure applied thereto through said operating pipe string, port means positioned in said sleeve valve means to communicate the interior of the sleeve valve means with said by-pass passages upon shifting of said sleeve valve means from said first position to said second position, means initially releasably securing said sleeve valve means to said mandrel in said first position, and means carried by said extension for closing off the bore of said liner upon withdrawal of said mandrel from said extension.

3. A liner setting and cementing tool for wells, comprising, a tubular extension connectible to a liner, means carried by said extension for anchoring the liner to a surrounding well casing, a tubular mandrel having radial ports through the wall thereof connectible to an operating pipe string and insertable in said extension, connector means releasably securing said mandrel to said extension and operable in response to rotation of the mandrel relative to said extension to release the mandrel, annular packer means carried on said extension about said mandrel, said packer means being expansible by axial compression transmitted from said operating string to seal off the annular space between the liner extension and said casing, cross-over means rotatably positioned about the mandrel having radial passages communicating the interior of the mandrel through said radial ports to the exterior of said extension below said packer means and having by-pass passages extending around said radial passages communicating the exterior of the extension above said packer means with the annular space between the mandrel and said extension, sleeve valve means having a plug-receiving seat in the bore thereof slidably disposed in the bore of said mandrel for longitudinal movement therein between a first position closing off said radial ports and a second position opening said radial ports, plugging means receivable on said seat, said sleeve valve means when its bore has been plugged being shiftable from said first to said second position in response to fluid pressure applied thereto through said operating pipe string, port means positioned in said sleeve valve means to communicate the interior of the sleeve valve means below the plug therein with said by-pass passages upon shifting of said sleeve valve means from said first position to said second position, and means initially releasably securing said sleeve valve means to said mandrel in said first position.

4. A liner setting and cementing tool for wells, comprising, a tubular extension connectible to a liner, means carried by said extension for anchoring the liner to a surrounding well casing, a tubular mandrel having radial ports through the wall thereof connectible to an operating pipe string and insertable in said extension, connector means releasably securing said mandrel to said extension and operable in response to rotation of the mandrel relative to said extension to release the mandrel, annular packer means carried on said extension about said mandrel, said packer means being expansible by axial compression transmitted from said operating string to seal off the annular space between the liner extension and said casing, cross-over means rotatably positioned about the mandrel having radial passages communicating the interior of the mandrel through said radial ports to the exterior of said extension below said packer means and having by-pass passages extending around said radial passages communicating the exterior of the extension above said packer means with the annular space between the mandrel and said extension, sleeve valve means slidably disposed in the bore of said mandrel for longitudinal movement therein between a first position closing off said radial ports and a second position opening said radial ports, plug means receivable in the bore of said sleeve valve means, said sleeve valve means when its bore has been plugged being shiftable from said first to said second position in response to fluid pressure applied thereto through said operating pipe string, port means positioned in said sleeve valve means to communicate the interior of the sleeve valve means with said by-pass passages upon shifting of said sleeve valve means from said first position to said second position, means initially releasably securing said sleeve valve means to said mandrel in said first position, and check valve means positioned in the liner extension to close off the bore of said liner to fluid-flow in both directions upon withdrawal of said mandrel from said extension.

5. A liner setting and cementing tool according to claim 4 wherein said check valve means comprises a tubular housing forming a portion of said extension, an upwardly closing check valve in the bore of said housing, and a downwardly closing check valve in the bore of said housing below said upwardly-closing check valve.

6. A liner setting and cementing tool for wells, comprising a tubular extension having radial ports through the wall thereof connectible to a liner, means carried by said extension for anchoring the liner to a surrounding well casing, a tubular mandrel insertable in said extension, means releasably securing said mandrel to said extension and operable in response to rotation of the mandrel relative to said extension to release said mandrel, an annular cross-over head rotatably supported on the mandrel above said extension, said head having radial passages providing communication through said radial ports between the interior of the mandrel and the exterior of said extension and having by-pass passages for conducting fluid around said radial passages through the annular space between the mandrel and said extension, an annular resilient packer means mounted about said mandrel above the cross-over head actuatable by axial compression to seal off the annular space between the liner extension and said casing at a point above said radial passages, packer expander means carried by the mandrel and connectible to an operating pipe string, said expander means being operable by relative downward movement of the operating pipe string to engage said packer means to axially compress the same, latch means connecting said mandrel to said expander means for initially holding the latter in non-engaging relation to said packer means and operable by limited rotational and longitudinal movement of said expander means relative to said mandrel to release said expander means for said relative downward movement, sleeve valve means having a plug-receiving seat in the bore thereof slidably disposed in the bore of said mandrel for longitudinal movement therein between a first position closing off said radial ports and a second position opening said radial ports, plugging means receivable on said seat, said sleeve valve means when its bore has been plugged being shiftable from said first to said second position in response to fluid pressure applied thereto through said operating pipe string, port means positioned in said sleeve valve means to communicate the interior of the sleeve valve means below the plug therein with said by-pass passages upon shifting of said sleeve valve means from said first position to said second position, and means initially releasably securing said sleeve valve means to said mandrel in said first position.

7. A liner setting and cementing tool according to claim 6 including check valve means in said liner extension operable to close off the bore of the liner against both upward and downward fluid flow therethrough upon withdrawal of said mandrel from said extension.

References Cited by the Examiner
UNITED STATES PATENTS

| | | | |
|---|---|---|---|
| 2,315,931 | 4/1943 | Burt et al. | 166—208 X |
| 2,416,842 | 3/1947 | O'Leary | 166—27 X |
| 3,033,290 | 5/1962 | Brown | 166—124 X |
| 3,072,204 | 1/1963 | Brown | 166—120 X |

CHARLES E. O'CONNELL, *Primary Examiner.*

D. H. BROWN, *Assistant Examiner.*